United States Patent
Groarke et al.

(10) Patent No.: US 10,607,220 B2
(45) Date of Patent: Mar. 31, 2020

(54) SYSTEMS AND METHODS FOR CONSOLIDATED MESSAGE PROCESSING

(71) Applicant: MasterCard International Incorporated, Purchase, NY (US)

(72) Inventors: Peter Groarke, Dublin (IE); Ahmed Hosny, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 773 days.

(21) Appl. No.: 15/247,114

(22) Filed: Aug. 25, 2016

(65) Prior Publication Data

US 2018/0060862 A1 Mar. 1, 2018

(51) Int. Cl.
| | |
|---|---|
| G06Q 20/40 | (2012.01) |
| G06Q 30/06 | (2012.01) |
| G06Q 20/12 | (2012.01) |
| G06Q 20/02 | (2012.01) |
| H04L 29/08 | (2006.01) |
| G06Q 20/34 | (2012.01) |

(52) U.S. Cl.
CPC ........ *G06Q 20/401* (2013.01); *G06Q 20/02* (2013.01); *G06Q 20/12* (2013.01); *G06Q 20/356* (2013.01); *G06Q 30/0601* (2013.01); *H04L 67/02* (2013.01); *H04L 67/2823* (2013.01)

(58) Field of Classification Search
USPC ....................................................... 235/375
See application file for complete search history.

(56) References Cited

U.S. PATENT DOCUMENTS

| | | | | |
|---|---|---|---|---|
| 4,816,658 | A * | 3/1989 | Khandwala | G07C 1/14 235/382 |
| 4,839,640 | A * | 6/1989 | Ozer | G07C 9/00103 235/382 |
| 6,658,393 | B1 | 12/2003 | Basch et al. | |
| 6,675,203 | B1 * | 1/2004 | Herrod | G06Q 10/087 709/217 |
| 7,775,429 | B2 * | 8/2010 | Radicella | G07C 9/00087 235/380 |
| 8,126,791 | B2 | 2/2012 | Chisholm | |
| 2002/0046092 | A1 * | 4/2002 | Ostroff | G06Q 20/06 705/14.26 |

(Continued)

OTHER PUBLICATIONS

PCT International Search Report and Written Opinion, Application No. PCT/US2017/047763, dated Oct. 24, 2017, 12 pps.

*Primary Examiner* — Michael G Lee
*Assistant Examiner* — David Tardif
(74) *Attorney, Agent, or Firm* — Armstrong Teasdale LLP (57) ABSTRACT

A network translation computing device for processing consolidated messages is disclosed. The network translation computing device receives a web-based authentication response including a plurality of data elements in a web-based format. The network translation computing device translates the plurality of data elements from the web-based format to a network-based format. The network translation computing device generates a network-format authorization request message including the plurality of data elements in the network-based format. The network translation computing device transmits the network-format authorization request message to an issuer of the transaction card to initiate an authorization process of the transaction.

21 Claims, 7 Drawing Sheets

(56) References Cited

U.S. PATENT DOCUMENTS

| | | | |
|---|---|---|---|
| 2002/0087894 A1* | 7/2002 | Foley | H04L 63/083 726/4 |
| 2004/0223450 A1* | 11/2004 | Bridges | H04Q 11/04 370/216 |
| 2004/0254848 A1 | 12/2004 | Golan et al. | |
| 2005/0247776 A1* | 11/2005 | Harper | G07C 9/00087 235/380 |
| 2006/0285665 A1 | 12/2006 | Wasserblat et al. | |
| 2007/0046424 A1* | 3/2007 | Davis | H04L 63/126 340/5.8 |
| 2007/0245158 A1* | 10/2007 | Giobbi | G06F 21/31 713/186 |
| 2009/0292568 A1 | 11/2009 | Khosravani et al. | |
| 2010/0012732 A1* | 1/2010 | Pinzinger | G06F 8/66 235/492 |
| 2010/0125470 A1 | 5/2010 | Chisholm | |
| 2010/0274720 A1 | 10/2010 | Carlson et al. | |
| 2012/0116975 A1 | 5/2012 | Carlson et al. | |
| 2012/0157062 A1 | 6/2012 | Kim et al. | |
| 2012/0259784 A1 | 10/2012 | Carlson et al. | |
| 2012/0310831 A1 | 12/2012 | Harris et al. | |
| 2016/0034900 A1* | 2/2016 | Nelsen | G06Q 20/4016 705/44 |

\* cited by examiner

SYSTEMS AND METHODS FOR CONSOLIDATED MESSAGE PROCESSING

BACKGROUND

The field of the present disclosure relates generally to networks and, more particularly, to systems and methods for using consolidated message processing to authorize payment transactions without acquirer involvement.

It is well known to have a multi-party transaction processing system. In these known systems, a consumer or cardholder initiates a transaction at a merchant point-of-sale using a payment card (e.g., a credit card, debit card, etc.). The merchant point-of-sale generates an authorization request that is transmitted to a merchant bank or acquirer. The authorization request is formatted as a network message specifically formatted for transmission over a transaction processing network (e.g., MasterCard®, VISA®, etc.), for example, an ISO8583 message. The acquirer receives the authorization request and transmits the authorization request to the transaction processing network (e.g., MasterCard®, VISA®, etc.), which triggers the transaction processing network to transmit the authorization request message to an issuer bank. The issuer bank or "issuer" has issued the payment card to the cardholder. When the issuer authorizes the transaction, an authorization response is transmitted back through the transaction processing network to the acquirer. The acquirer returns an authorization response to the merchant point-of-sale, which allows the transaction to be finalized.

In at least some multi-party transaction processing systems, authentication processes have been developed. Authentication is designed to authenticate or verify that the person using the payment card to initiate the transaction is, in fact, the cardholder associated with the payment card. In other words, these authentication processes are meant to reduce fraud. The importance, and ubiquity, of authentication processes has expanded as e-commerce, or the body of transactions initiated over the Internet, has ballooned in both frequency and volume of sales. The "card-not-present" (CNP) transactions that define e-commerce present greater opportunity for fraudulent transactions, as typically only a payment card number is needed to initiate a transaction. Accordingly, more rigorous authentication processes are continually being designed and implemented in an effort to safeguard cardholder information and reduce fraudulent transactions.

One authentication protocol is known as 3-D Secure® (3DS). 3DS is used by merchants and acquirers to authenticate transactions before they proceed to authorization. In at least one implementation, to authenticate a transaction, a merchant at which the transaction is initiated generates a "web call" or Internet-based message (e.g., an XML-formatted message) to "call" or activate the 3DS protocol. This 3DS web call includes data elements associated with the initiated transaction, such as a merchant identifier and transaction amount, as well as authentication data elements (e.g., cardholder information, device information, digital wallet information, location information, etc.) that facilitate authentication of the cardholder. The merchant transmits the 3DS web call to a 3DS provider, which may include a third party, an issuer, and/or a transaction processing network. If authentication is successful, the 3DS provider generates a 3DS web response (e.g., an XML-formatted message) including an Accountholder Authentication Value (AAV) that indicates the authentication was successful. The 3DS web response is transmitted to the issuer and back to the merchant. Only then does the merchant generate and transmit an authorization request to an acquirer. In other words, the merchant is generating and transmitting two separate messages in series, first to the issuer and then to the acquirer, which can add to transaction processing time. This additional message can add a great deal of time and processing requirements, especially for very large online merchants (e.g., Google®, Amazon®).

Therefore, a transaction processing system is needed in which a merchant is capable of authorizing payment transactions without acquirer involvement.

BRIEF DESCRIPTION

In one aspect, a network translation computing device processing consolidated messages is provided. The network translation computing device includes a processor in communication with a memory. The processor is programmed to receive a web-based authentication response including a plurality of data elements in a web-based format. The web-based authentication response is associated with a successful authentication of a transaction initiated by a cardholder using a payment card at a merchant. The processor is further programmed to translate the plurality of data elements from the web-based format to a network-based format. The processor is also programmed to generate a network-format authorization request message including the plurality of data elements in the network-based format. The processor is further programmed to transmit the network-format authorization request message to an issuer of the payment card to initiate an authorization process of the transaction.

In another aspect, a transaction processing system processing consolidated messages is provided. The transaction processing system includes a directory server. The directory server is configured to route a web-based authentication request from a merchant to an access control server. The web-based authentication request includes a plurality of data elements in a web-based format and is associated with authentication of a transaction initiated by a cardholder using a payment card at the merchant. The directory server is further configured to receive a web-based authentication response from the access control server. The web-based authentication request includes the plurality of data elements in the web-based format as well as additional authentication indicators indicating successful authentication of the transaction. The directory server is also configured to route the web-based authentication response to a network translation computing device, bypassing an acquirer associated with the merchant.

In yet another aspect, a method for processing consolidated messages is provided. The method is implemented using a directory server. The method includes routing, by the directory server, a web-based authentication request from a merchant to an access control server. The web-based authentication request includes a plurality of data elements in a web-based format and is associated with authentication of a transaction initiated by a cardholder using a payment card at the merchant. The method further includes receiving, by the directory server, a web-based authentication response from the access control server. The web-based authentication request includes the plurality of data elements in the web-based format as well as additional authentication indicators indicating successful authentication of the transaction. The method also includes routing, by the directory server, the web-based authentication response to a network translation computing device.

BRIEF DESCRIPTION OF THE DRAWINGS

FIGS. 1-7 show example embodiments of the methods and systems described herein.

DETAILED DESCRIPTION

The system described herein is an enhanced, consolidated message processing system configured to translate data received in a 3DS web-based message (e.g., a 3DS web call or a 3DS web response) into a network-format authorization request message without acquirer involvement. A merchant need only generate and transmit a single request message— the 3DS web call—for the transaction to be authenticated and authorized. By eliminating the second merchant message (e.g., the authorization request that is routed through the acquirer), the system described herein is configured to reduce transaction processing times, reduce processing requirements for merchant computing devices, and reduce issuer declines, which reduces merchant cost.

The methods and systems described herein may be implemented using computer programming or engineering techniques including computer software, firmware, hardware or any combination or subset thereof, wherein the technical effects may be achieved by performing one of the following steps: (a) identifying a transaction as a 3DS-eligible transaction; (b) generating a 3DS web call; (c) calling a directory server to determine whether 3DS authentication services are available for the cardholder; (d) identifying an access control server (ACS) associated with an issuer of a payment card and providing contact details for the ACS; (e) transmitting the 3DS web call to the ACS; (f) authenticating the transaction (i.e., to confirm the identity of the cardholder) according to specific rules and criteria set by the issuer; (g) generating a 3DS web response; (h) confirming that the transaction is eligible for the consolidated message processing system; (i) translating web-based data elements from the 3DS web response into a network-format authorization request message; (j) authorizing the transaction; and (k) returning an authorization response.

The systems and methods described herein are configured to facilitate (a) reducing transaction processing times by reducing a number of messages required by a merchant computing devices and/or an acquirer, (b) reducing transaction processing times by increasing available bandwidth, (c) reducing processing requirements for merchant computing devices by reducing the number of messages transmitted by the merchant computing devices, (c) reducing issuer declines by reducing the number of messages transmitted by the merchant computing devices and/or the acquirer and therefore, reducing a number of possible transmission errors and/or issues, and (d) reducing merchant cost.

Described herein are computer systems such as a merchant computing device, a directory server, an access control server (ACS), a network translation computing device, an acquirer device, and an issuer device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor".

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

As used herein, the terms "transaction card," "financial transaction card," and "payment card" refer to any suitable transaction card, such as a credit card, a debit card, a smartcard, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

The following detailed description illustrates embodiments of the disclosure by way of example and not by way of limitation. It is contemplated that the disclosure has general application to transactions involving authentication.

Figure 1:
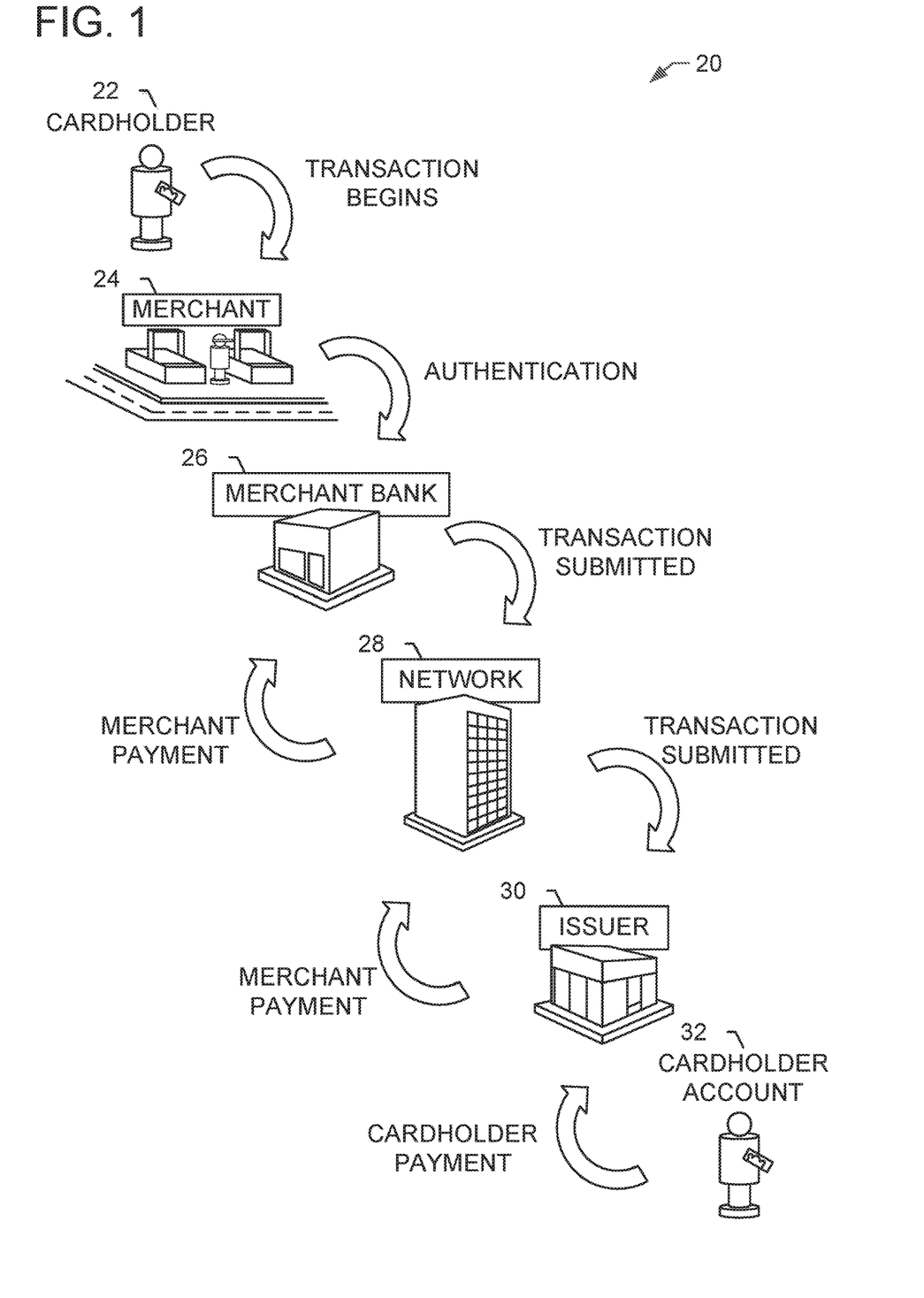
FIG. 1 is a schematic diagram illustrating an example multi-party payment card system for enabling payment authorizations in payment card transactions.

FIG. 1 is a schematic diagram illustrating an example multi-party payment card system 20 for enabling payment authorizations in payment card transactions. The present disclosure relates to payment card system 20, such as a credit card payment system using the MasterCard® payment card system payment network 28 (also referred to as an "interchange" or "interchange network," or a "transaction processing network"). MasterCard® payment card system payment network 28 is a proprietary communications standard promulgated by MasterCard International Incorporated® for the exchange of financial transaction data between financial institutions that are members of MasterCard International Incorporated. (MasterCard is a registered trademark of MasterCard International Incorporated located in Purchase, N.Y.).

In payment card system 20, a financial institution such as an issuer 30 issues a payment card for an account, such as a credit card account or a debit card account, to a cardholder 22, who uses the payment card to tender payment for a purchase from a merchant 24. To accept payment with the payment card, merchant 24 must normally establish an account with a financial institution that is part of the financial payment system. This financial institution is usually called the "merchant bank" or the "acquiring bank" or "acquirer bank" or simply "acquirer". When a cardholder 22 tenders payment for a purchase with a payment card (also known as a financial transaction card), merchant 24 requests authorization from acquirer 26 for the amount of the purchase. Such a request is referred to herein as an authorization request message. The request may be performed over the telephone, but is usually performed through the use of a point-of-interaction terminal, also referred to herein as a point-of-sale device, which reads the cardholder's account information from the magnetic stripe on the payment card and communicates electronically with the transaction processing computers of acquirer 26. Alternatively, acquirer 26 may authorize a third party to perform transaction processing on its behalf. In this case, the point-of-interaction terminal will be configured to communicate with the third party. Such a third party is usually called a "merchant processor" or an "acquiring processor".

Using payment card system payment network 28, the computers of acquirer 26 or the merchant processor will communicate with the computers of issuer 30, to determine whether the cardholder's account 32 is in good standing and whether the purchase is covered by the cardholder's available credit line or account balance. Based on these determinations, the request for authorization will be declined or accepted. If the request is accepted, an authorization code is issued to merchant 24.

When a request for authorization is accepted, the available credit line or available balance of cardholder's account 32 is decreased. Normally, a charge is not posted immediately to a cardholder's account because bankcard associations, such as MasterCard International Incorporated, have promulgated rules that do not allow a merchant to charge, or "capture," a transaction until goods are shipped or services are delivered. When a merchant ships or delivers the goods or services, merchant 24 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, cardholder's account 32 is decreased. Normally, a charge is posted immediately to cardholder's account 32. The bankcard association then transmits the approval to the acquiring processor for distribution of goods/services, or information or cash in the case of an ATM.

After a transaction is captured, the transaction is settled between merchant 24, acquirer 26, and issuer 30. Settlement refers to the transfer of financial data or funds between the merchant's account, acquirer 26, and issuer 30 related to the transaction. Usually, transactions are captured and accumulated into a "batch," which is settled as a group.

Figure 2:
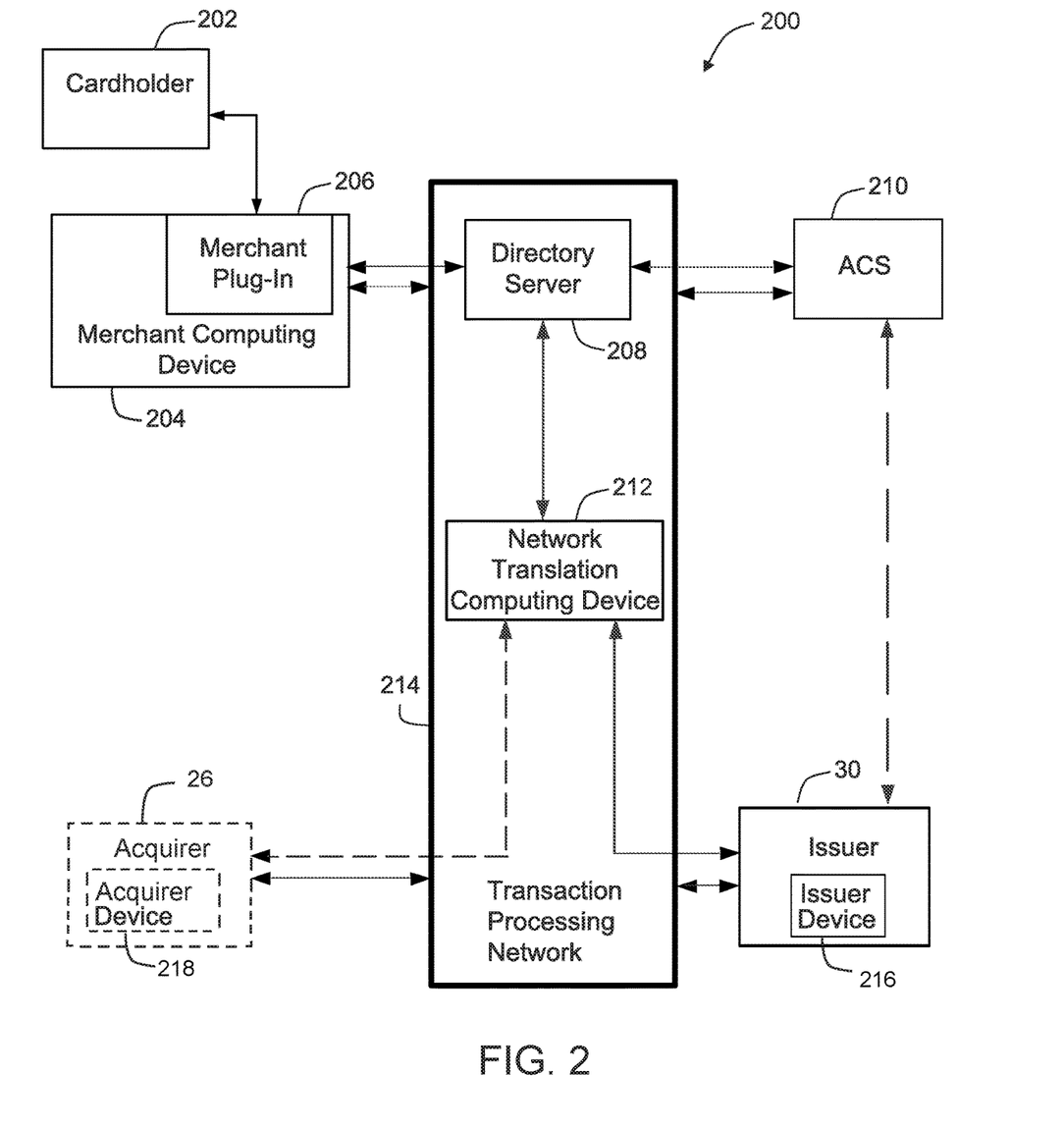
FIG. 2 is a diagram illustrating an example of an enhanced, consolidated message processing system that may be incorporated into the payment card system shown in FIG. 1.

FIG. 2 is a diagram illustrating an example of an enhanced, consolidated message processing system 200 that may be incorporated into payment card system 20 (shown in FIG. 1) to implement consolidated message processing. System 200 includes a merchant computing device 204 operated by a merchant, such as merchant 24 (shown in FIG. 1), a merchant plug-in (MPI) 206, a directory server 208, an access control server (ACS) 210, a network translation computing device 212, a transaction processing network 214 (such as payment network 28, shown in FIG. 1), and an issuer device 216 operated by an issuing bank, such as issuer 30 (shown in FIG. 1).

A cardholder 202 initiates a transaction at a merchant using a payment card. As defined herein, the merchant may be a physical merchant or a virtual merchant (i.e., an online merchant). Merchant computing device 204 associated with the merchant generates a 3DS web call (e.g., an XML-formatted message), also referred to as an "authentication request," including a plurality of data elements. Each data element of the 3DS web call includes information associated with the transaction. Some of the data elements include authenticating information, such as data associated with cardholder 202, a cardholder device at which the transaction is initiated, transaction location information, digital wallet information, and/or any other information suitable for authentication of the transaction. In one embodiment, this 3DS web call is routed by MPI 206 at merchant computing device 204, which identifies the transaction as a 3DS-eligible transaction. In some embodiments, MPI 206 calls directory server 208, which may be operated by and/or associated with transaction processing network 214, to determine whether 3DS authentication services are available for the cardholder (e.g., whether the payment card issued by the issuer is 3DS-eligible). Directory server 208 may also identify to MPI 206 ACS 210 and provide contact details for ACS 210 to MPI 206. In the example embodiment, ACS 210 is associated with issuer 30 of the payment card.

MPI 206 transmits the 3DS web call to ACS 210 through transaction processing network 214 (e.g., using a web browser or software application through which the cardholder initiated the transaction). ACS 210 functions to authenticate the transaction (i.e., to confirm the identity of the cardholder), for example, according to specific rules and criteria set by issuer 30. ACS 210 generates a 3DS web response (e.g., an XML-formatted message), also referred to as an authentication response. The 3DS web response includes all of the data elements in the 3DS web call (authentication request), as well as additional data elements indicating whether the authentication was successful ("authentication indicators"), such as an AAV. In previous systems, ACS 210 would transmit the authentication response back to merchant computing device 204 (e.g., MPI 206), which would trigger the generation of an authorization request by merchant computing device 204 to acquirer 26. Under the consolidated message processing system, directory server 208 (and/or another component of transaction processing network 214 receives the authentication response and does not route the authentication response back to merchant computing device 204. Instead, directory server 208 routes the authentication response to a network translation computing device 212 operated by and/or associated with transaction processing network 214. Network translation computing device 212 is configured to translate web-based data elements from the 3DS web response into a network-format authorization request message (e.g., an ISO8583 network message).

More specifically, network translation computing device 212 confirms that the transaction meets all of the specific criteria set by the merchant (and/or issuer 30), such that the transaction is eligible for consolidated message processing. In some embodiments, consolidated message processing system 200 is implemented according to a specific set of rules. For example, in certain embodiments, consolidated message processing system 200 only implements consolidated message processing for particular merchants. These merchants include merchants that have registered for participation in this scheme, and may specifically include "Digital Giant Merchants" (DGMs), such as Google®, Amazon®, and eBay®, which have significant and fairly predictable revenue streams and whose transaction processing requirements are particularly large. DGMs, in part due to the scale of their transaction processing needs, may be most concerned with minimizing issuer declines and having the most efficient cardholder checkout experience possible. Moreover, these DGMs may have internal fraud detection protocols. The merchants, specifically the DGMs, may impose particular rules that define when consolidated message processing system 200 is to be implemented. For example, these rules may include: (i) a primary account number (PAN) or other account identifier included in the 3DS web call is associated with a particular issuer 30 (e.g., an issuer on a list or in a table of known and/or trusted issuers, and/or issuers that have agreed to participate in consolidated message processing system 200); (ii) the transaction meets specific criteria (e.g., the transaction amount does not exceed a maximum threshold amount, the transaction is successfully authenticated, the transaction is not associated with a high-risk country, etc.); and/or (iii) any other rules imposed by the merchant. An issuer (e.g., issuer 30) that agrees to participate in consolidated message processing system 200 may additionally or alternatively impose one or more rules that must be met for consolidated message processing system 200 to be implemented.

Upon such confirmation, network translation computing device 212 parses the 3DS web response for the data elements therein. Network translation computing device 212 translates the information in each data element from the web-based format (e.g., XML) to the network-based format. In some embodiments, network translation computing device 212 populates a table mapping each web-based format data element to the corresponding network-based format data element. Network translation computing device 212 generates a network-format authorization request message including the network-based formatted data elements. In particular, the network-format authorization request message includes the authentication indicators. Network translation computing device 212 transmits the network-format authorization request over transaction processing network 214 to issuer 30 for authorization, bypassing acquirer 26. In this implementation, the network-format authorization request represents a "consolidated message," in that it replaces the independently generated network-format authorization request from the merchant using data from the originally generated authentication request. Issuer 30 authorizes (or does not authorize) the transaction, as it would normally do. Issuer 30 returns an authorization response through transaction processing network 214 to merchant computing device 204, such that the transaction is authorized and allowed to proceed.

Some variations in the above-described implementation are contemplated. In some embodiments, consolidated message processing system 200 further includes an acquirer device 218 operated by an acquiring bank, such as acquirer 26 (shown in FIG. 1). Transaction processing network 214 transmits an authorization notification message to acquirer device 218, notifying acquirer device 218 and acquirer 26 of a successfully authorized transaction.

In certain embodiments in which acquirer 26 is completely bypassed, additional steps may need to be taken to ensure that acquirer 26 has all the necessary information for settlement and clearing of the transactions processed using consolidated message processing system 200. In some embodiments, the authorization notification message transmitted to acquirer 26 by network translation computing device 212 contains sufficient information that acquirer 26 may be prepared for the settlement process involving that transaction. In other embodiments, networking translation computing device 212 may generate an aggregated notification message for transmission to acquirer 26, the aggregated notification message including settlement details for a plurality (or "batch") of transactions processed during a particular period (e.g., during an entire day).

In still other embodiments, consolidated message processing system 200 includes acquirer 26 in the authorization process but does so without requiring merchant computing device 204 to generate and transmit the network-based authorization request message. Instead, network translation computing device 212 generates the network-based authorization request message as described above and transmits that network-based authorization request message to acquirer 26, without requiring additional input from merchant computing device 204. The authorization process proceeds as normal. Therefore, consolidated message processing system 200 may still maintain the processing improvements for merchant computing device 204 described above, even while involving acquirer 26 in the authorization. These embodiments may be more suited for smaller merchants, who may not have the revenue streams to comfortably bypass acquirer 26 altogether.

In additional embodiments, network translation computing device 212 transmits the 3DS web call and/or the 3DS web response to issuer 30 without translation thereof. In some embodiments, this may act as an indication of a successful authentication. In further embodiments, network translation computing device 212 then translates the 3DS web response into a network-format authorization request and transmits the network-format authorization request to issuer 30 in a separate message, to initiate authorization independently.

Figure 3:
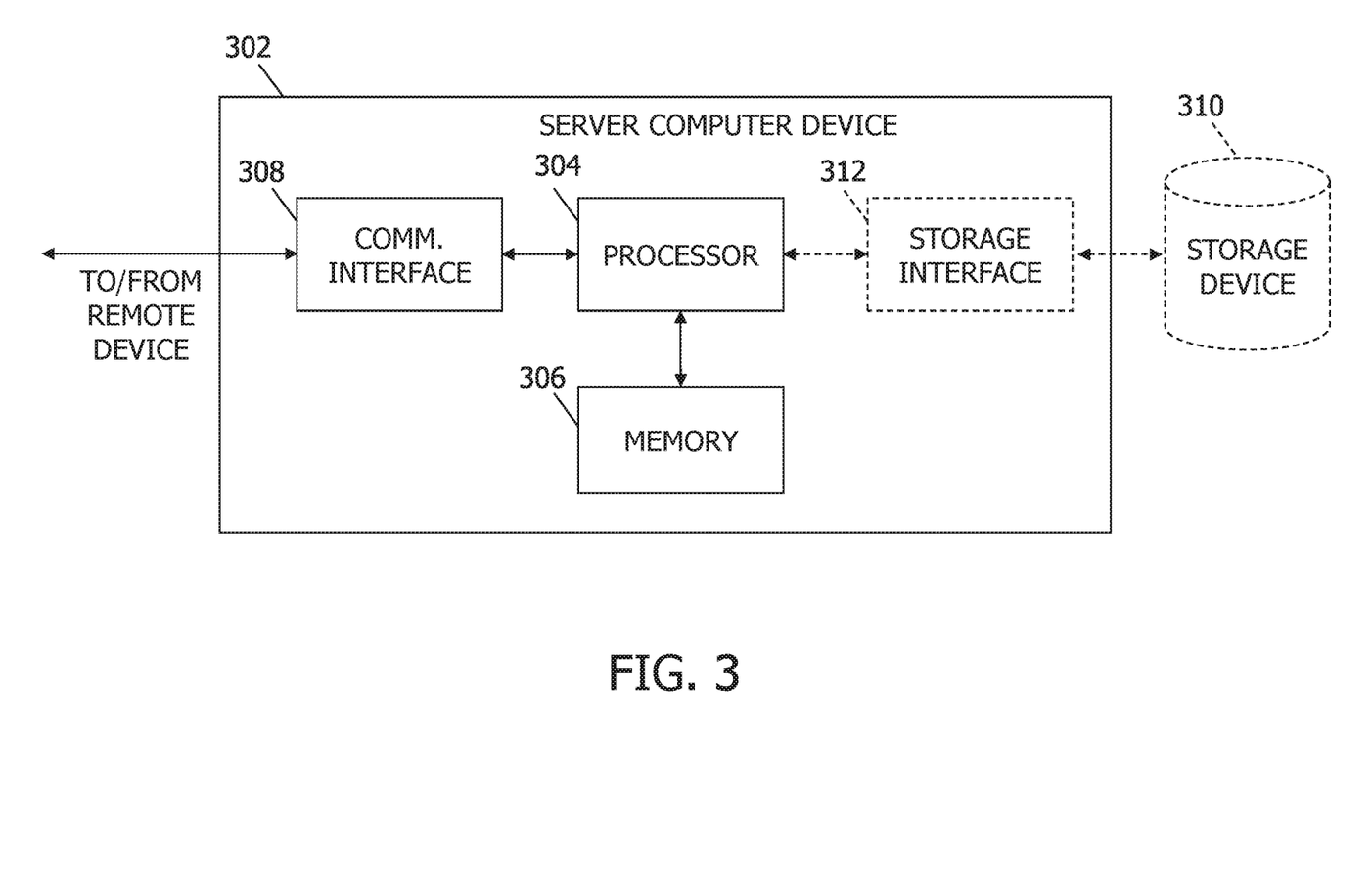
FIG. 3 depicts an exemplary configuration of a server computing device used in the enhanced, consolidated message processing system shown in FIG. 2.

FIG. 3 depicts an exemplary configuration of a server computing device 302, such as merchant computing device 204 with plug-in (MPI) 206, directory server 208, and for access control server (ACS) 210 (all shown in FIG. 2). Server computing device 302 may include a processor 304 for executing instructions. Instructions may be stored in a memory area 306, for example. Processor 304 may include one or more processing units (e.g., in a multi-core configuration).

Processor 304 may be operatively coupled to a communication interface 308 such that server computing device 302 may be capable of communicating with a remote device such as another server computing device 302. For example, communication interface 308 of ACS 210 may receive requests from directory server 208 via the Internet.

Processor 304 may also be operatively coupled to a storage device 310. Storage device 310 may be any computer-operated hardware suitable for storing and/or retrieving data. In some embodiments, storage device 310 may be integrated in server computing device 302. For example, server computing device 302 may include one or more hard disk drives as storage device 310. In other embodiments, storage device 310 may be external to server computing device 302 and may be accessed by a plurality of server computing devices 302. For example, storage device 310 may include multiple storage units such as hard disks or solid state disks in a redundant array of inexpensive disks (RAID) configuration. Storage device 310 may include a storage area network (SAN) and/or a network attached storage (NAS) system.

In some embodiments, processor 304 may be operatively coupled to storage device 310 via a storage interface 312. Storage interface 312 may be any component capable of providing processor 304 with access to storage device 310. Storage interface 312 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 304 with access to storage device 310.

Memory areas 310 and 306 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 4:
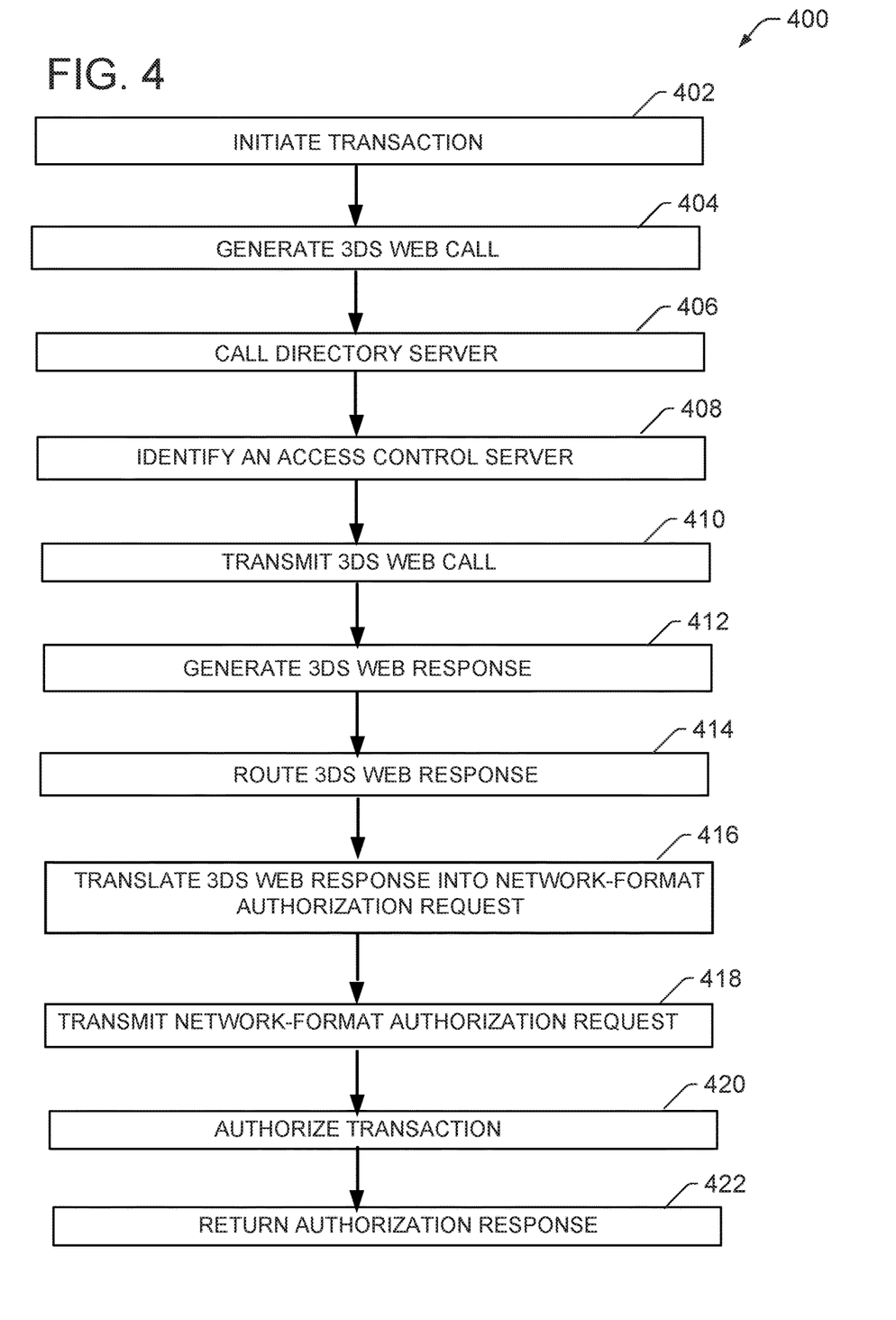
FIG. 4 is a flowchart of an example method for using the enhanced, consolidated message processing system shown in FIG. 2.

FIG. 4 is a flowchart of an example method 400 for using an enhanced, consolidated message processing system (e.g., consolidated message processing system 200 shown in FIG. 2), in accordance with one example embodiment of the present disclosure. A cardholder initiates 402 a transaction at a merchant computing device using a payment card. A merchant plug-in (MPI) at the merchant computing device identifies the transaction as a 3DS-eligible transaction. The merchant computing device generates 404 a 3DS web call (i.e., an authentication request), including a plurality of data elements. The MPI calls 406 a directory server operated by and/or associated with the transaction processing network to determine whether 3DS authentication services are available for the cardholder (e.g., whether the payment card issued by the issuer is 3DS-eligible). The directory server also identifies 408 to the MPI an access control server (ACS) associated with an issuer of the payment card and provides contact details for the ACS to the MPI.

The MPI transmits 410 the 3DS web call to the ACS. The ACS functions to authenticate the transaction (i.e., to confirm the identity of the cardholder), for example, according to specific rules and criteria set by the issuer. The ACS generates 412 a 3DS web response (i.e., an authentication response). The 3DS web response includes all of the data elements in the 3DS web call (authentication request), as well as additional data elements indicating whether the authentication was successful ("authentication indicators"), such as an AAV. The directory server (and/or another component of the transaction processing network) receives and routes 414 the 3DS web response to a network translation computing device. Network translation computing device 212 confirms that the transaction meets all of the specific criteria set by the merchant and/or the issuer, such that the transaction is eligible for the consolidated message processing system. Upon such confirmation, network translation computing device 212 translates 416 web-based data elements from the 3DS web response into a network-format authorization request message (e.g., an ISO8583 network message).

Network translation computing device 212 transmits 418 the network-format authorization request over the transaction processing network to the issuer for authorization, bypassing an acquirer. The issuer authorizes 420 (or does not authorize) the transaction, as it would normally do. The issuer returns 422 an authorization response through transaction processing network to the merchant computing device, such that the transaction is authorized and allowed to proceed.

Figure 5:
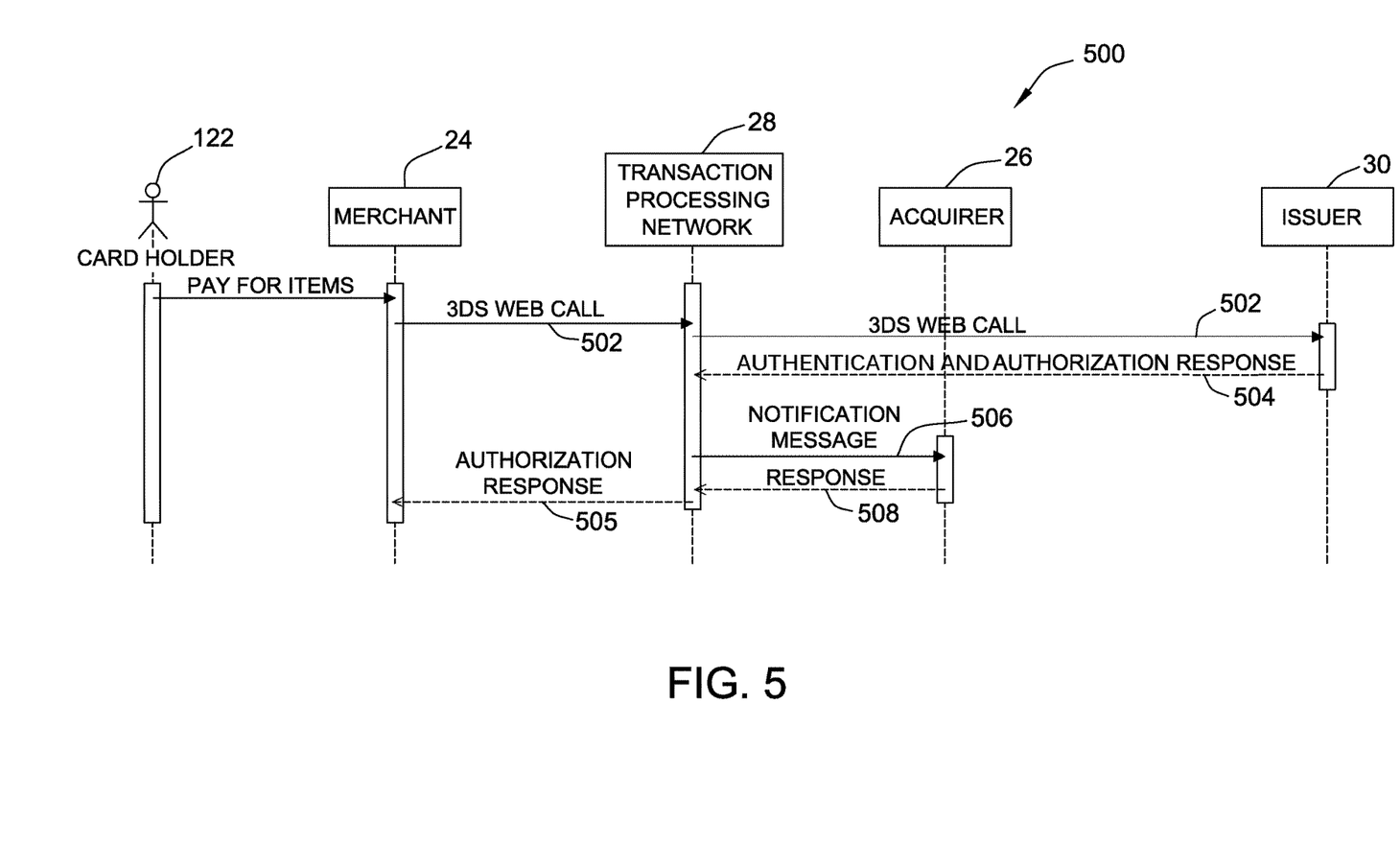
FIG. 5 is a message flowchart of an example implementation of the enhanced, consolidated message processing system shown in FIG. 2.

FIG. 5 is a message flowchart of an example implementation of the consolidated message processing system 500. A cardholder 122 (shown in FIG. 1) initiates a transaction at a merchant 24 (shown in FIG. 1) using a payment card. A merchant computing device associated with merchant 24 generates a 3DS web call 502 (i.e., an authentication request). 3DS web call 502 is routed by a merchant plug-in (MPI) at the merchant computing device. The MPI calls a directory server operated by and/or associated with a transaction processing network 28 to determine whether 3DS authentication services are available for cardholder 122. The directory server identifies to the MPI an access control server (ACS) associated with an issuer 30 of the payment card and provides contact details for the ACS to the MPI.

The MPI transmits 3DS web call 502 to the ACS. The ACS associated with issuer 30 authenticates the transaction according to specific rules and criteria set by issuer 30. In addition, the directory server routes 3DS web call 502 to a network translation computing device 212 (shown in FIG. 2) operated by and/or associated with transaction processing network 28. Network translation computing device 212 translates the 3DS web call 502 into a network-format authorization request and transmits the network-format authorization request to issuer 30 in a separate message, to initiate authorization independently.

The ACS directly notifies issuer 30 regarding the results of the authentication. If authentication is successful, issuer 30 proceeds to authorize (or not authorize) the transaction, as it would normally do. Issuer 30 returns a single authentication and authorization response 504 to transaction processing network 28, whereupon an authorization response 505 included in authentication and authorization response 504 is directed to merchant 24, such that the transaction is authorized and allowed to proceed.

The transaction processing network also transmits an authorization notification message 506 to acquirer 26, notifying acquirer 26 of a successfully authorized transaction. Authorization notification message 506 to acquirer 26 has necessary information for settlement and clearing of the transaction processed using the consolidated message processing system. In some embodiments, acquirer 26 returns a confirmation response message 508.

Figure 6:
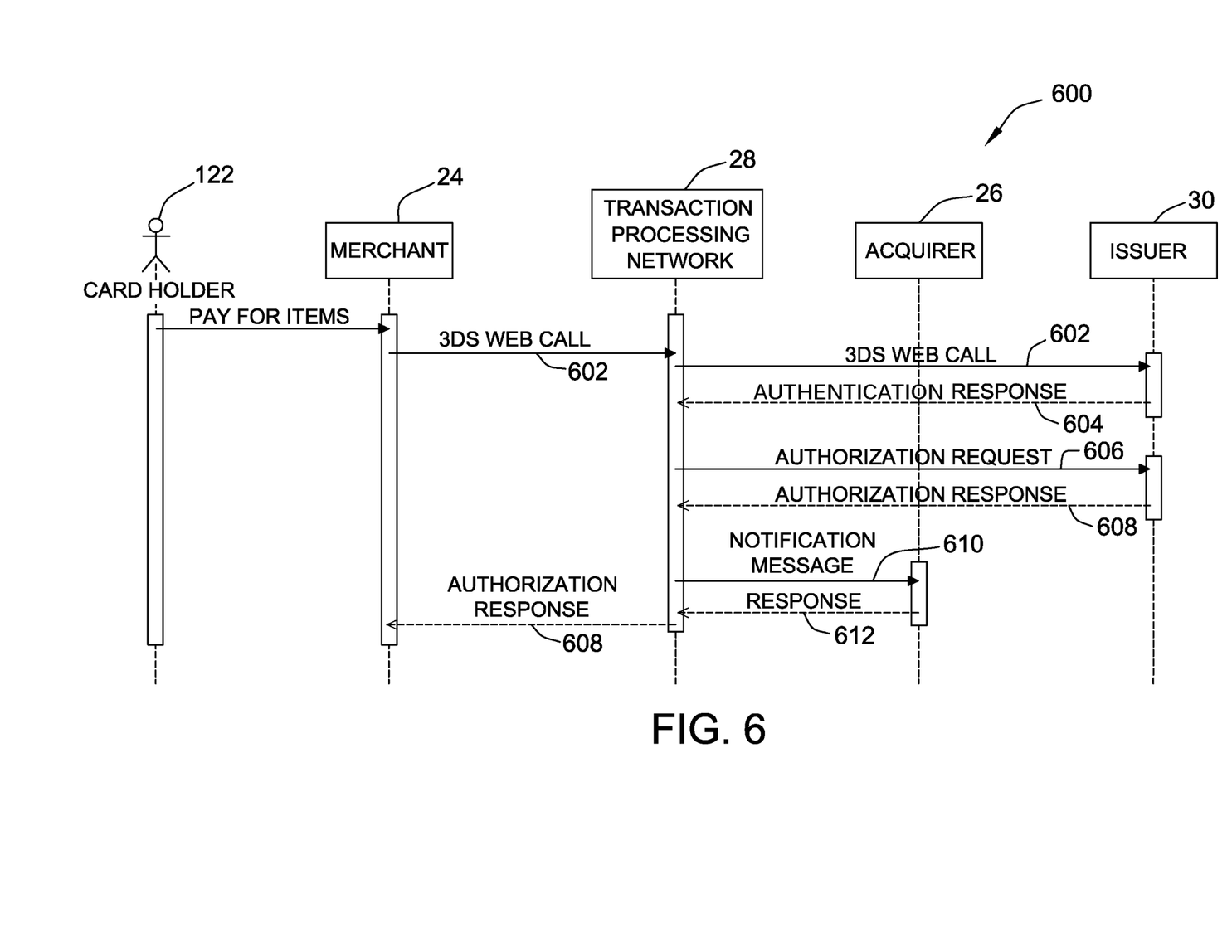
FIG. 6 is a message flowchart of a second example implementation of the enhanced, consolidated message processing system shown in FIG. 2.

FIG. 6 is a message flowchart of a second example implementation of the consolidated message processing system 600. A cardholder 122 (shown in FIG. 1) initiates a transaction at a merchant 24 (shown in FIG. 1) using a payment card. A merchant computing device associated with merchant 24 generates a 3DS web call 602 (i.e., an authentication request). 3DS web call 602 is routed by a merchant plug-in (MPI) at the merchant computing device. The MPI calls a directory server operated by and/or associated with a transaction processing network 28 to determine whether 3DS authentication services are available for cardholder 122. The directory server identifies to the MPI an access control server (ACS) associated with an issuer 30 of the payment card and provides contact details for the ACS to the MPI. The MPI transmits 3DS web call 602 to the ACS. The ACS associated with issuer 30 authenticates the transaction according to specific rules and criteria set by issuer 30. The ACS generates an authentication response 604 and transmits authentication response 604 to the directory server.

The directory server (and/or another component of the transaction processing network) receives authentication response 604 and routes authentication response 604 to a network translation computing device operated by and/or associated with transaction processing network 28. The network translation computing device generates a network-format authorization request message 606. The network translation computing device transmits network-format authorization request message 606 to issuer 30 for authorization, bypassing an acquirer 26. Issuer 30 authorizes (or does not authorize) the transaction, as it would normally do. Issuer 30 returns an authorization response 608 through transaction processing network to merchant 24, such that the transaction is authorized and allowed to proceed.

The transaction processing network transmits an authorization notification message 610 to acquirer 26, notifying acquirer 26 of a successfully authorized transaction. Authorization notification message 610 to acquirer 26 has necessary information for settlement and clearing of the transaction processed using the consolidated message processing system. In some embodiments, acquirer 26 returns a confirmation response message 612.

Figure 7:
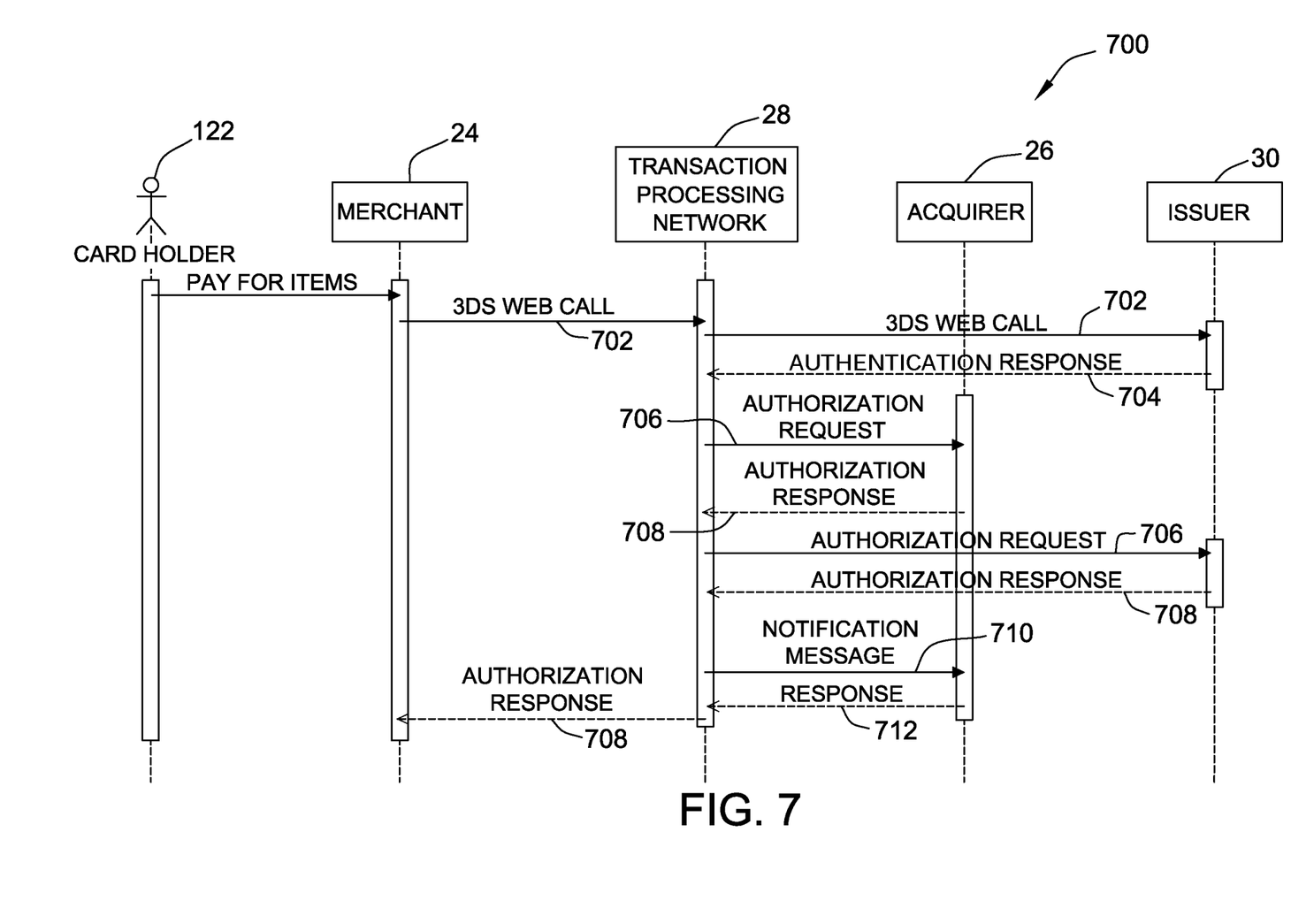
FIG. 7 is a message flowchart of a third example implementation of the enhanced, consolidated message processing system shown in FIG. 2.

FIG. 7 is a message flowchart of a third example implementation of the consolidated message processing system 700. A cardholder 122 initiates a transaction at a merchant 24 using a payment card. A merchant computing device associated with merchant 24 generates a 3DS web call 702 (i.e., an authentication request). 3DS web call 702 is routed by a merchant plug-in (MPI) at the merchant computing device. The MPI calls a directory server operated by and/or associated with a transaction processing network 28 to determine whether 3DS authentication services are available for cardholder 122. The directory server identifies to the MPI an access control server (ACS) associated with an issuer 30 of the payment card and provides contact details for the ACS to the MPI. The MPI transmits 3DS web call 702 to the ACS. The ACS associated with issuer 30 authenticates the transaction according to specific rules and criteria set by issuer 30. The ACS generates an authentication response 704.

The directory server (and/or another component of the transaction processing network) receives authentication response 704 and routes authentication response 704 to a network translation computing device operated by and/or associated with transaction processing network 28. The network translation computing device generates a network-format authorization request message 706 using 3DS web call 702. The network translation computing device transmits network-format authorization request message 706 to an acquirer 26 for authorization, without requiring additional input from merchant computing device 204. Acquirer 26 authorizes (or does not authorize) the transaction, as it would normally do. Acquirer 26 returns an authorization response through transaction processing network to network translation computing device. In this embodiment, the system maintains the processing improvements for merchant computing device described above, even while involving acquirer 26 in the authorization. These embodiments may be more suited for smaller merchants, who may not have the revenue streams to comfortably bypass acquirer 26 altogether.

The network translation computing device then transmits network-format authorization request message 706 to issuer 30 for authorization. Issuer 30 authorizes (or does not authorize) the transaction, as it would normally do. Issuer 30 returns an authorization response 708 through transaction processing network to merchant 24, such that the transaction is authorized and allowed to proceed.

The transaction processing network transmits an authorization notification message 710 to acquirer 26, notifying acquirer 26 of a successfully authorized transaction. The authorization notification message to acquirer 26 has necessary information for settlement and clearing of the transaction processed using the consolidated message processing system. In some embodiments, acquirer 26 returns a confirmation response message 712.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A network translation computing device processing consolidated messages, said network translation computing device including a processor in communication with a memory, said processor programmed to:
   transmit, to an access control server, a web-based authentication request including a plurality of request data elements in a web-based format, the web-based authentication request requesting authentication of a transaction initiated by a cardholder using a transaction card at a merchant, wherein the access control server is associated with an issuer of the transaction card;
   receive, from the access control server, a web-based authentication response including a plurality of response data elements in the web-based format, wherein the web-based authentication response is associated with successful authentication of the transaction by the access control server associated with the issuer;
   translate the plurality of response data elements from the web-based format to a network-based format;
   generate a network-format authorization request message including the plurality of data elements in the network-based format; and
   transmit the network-format authorization request message to the issuer of the transaction card to initiate an authorization process of the transaction.

2. The network translation computing device of claim 1, said processor further programmed to retrieve a plurality of rules defining whether a transaction is eligible to have the plurality of response data elements translated, and confirm the transaction meets the plurality of rules to be eligible for translation.

3. The network translation computing device of claim 2, wherein the plurality of rules include at least one rule associated with the merchant.

4. The network translation computing device of claim 2, wherein the plurality of rules includes at least one rule associated with the issuer.

5. The network translation computing device of claim 1, wherein the plurality of response data elements include the plurality of request data elements and at least one authentication indicator indicating authentication of the transaction was successful.

6. The network translation computing device of claim 1, said processor further programmed to transmit the network-format authorization request message to an acquirer associated with the merchant without further input from the merchant.

7. The network translation computing device of claim 1, said processor further programmed to generate an authorization notification message including at least some of the plurality of response data elements of the transaction, and transmit the authorization notification message to an acquirer associated with the merchant.

8. A transaction processing system for processing consolidated messages, said transaction processing system comprising:
   a directory server configured to:
      route a web-based authentication request from a merchant to an access control server, wherein the web-based authentication request includes a plurality of data elements in a web-based format and is associated with authentication of a transaction initiated by a cardholder using a payment card at the merchant, wherein the access control server is associated with an issuer of the payment card;
      receive a web-based authentication response from the access control server, wherein the web-based authentication response includes the plurality of data elements in the web-based format as well as one or more additional authentication indicators indicating successful authentication of the transaction; and
      route the web-based authentication response to a network translation computing device, bypassing an acquirer associated with the merchant.

9. The transaction processing system of claim 8, said transaction processing system further comprising:
   said network translation computing device configured to:
      receive the web-based authentication response;
      translate the plurality of data elements and the one or more authentication indicators from the web-based format to a network-based format;
      generate a network-format authorization request message including the plurality of data elements and the one or more authentication indicators in the network-based format; and
      transmit the network-format authorization request message to the issuer to initiate an authorization process.

10. The transaction processing system of claim 8, wherein the network translation computing device retrieves a plurality of rules defining whether a transaction is eligible to have the plurality of data elements and the one or more authentication indicators translated and confirms that the transaction meets the plurality of rules to be eligible for translation.

11. The transaction processing system of claim 9, wherein the network translation computing device transmits the network-format authorization request message to an acquirer associated with the merchant without further input from the merchant.

12. The transaction processing system of claim 9, wherein the network translation computing device is further configured to:
generate an authorization notification message including at least some of the plurality of data elements of the transaction; and
transmit the authorization notification message to an acquirer associated with the merchant.

13. The transaction processing system of claim 9, wherein the web-based format includes XML formatting, and wherein the network-based format includes ISO 8583 network message formatting.

14. The transaction processing system of claim 8, wherein the directory server is further configured to identify the access control server associated with the issuer of the payment card.

15. A computer-implemented method for processing consolidated messages, said method implemented using a network translation computing device, said method comprising:
transmitting, to an access control server, a web-based authentication request including a plurality of data elements in a web-based format, the web-based authentication request requesting authentication of a transaction initiated by a cardholder using a transaction card at a merchant, wherein the access control server is associated with an issuer of the transaction card;
receiving, by the network translation computing device from the access control server, a web-based authentication response, wherein the web-based authentication response includes the plurality of data elements in the web-based format as well as one or more authentication indicators indicating successful authentication of the transaction by the access control server associated with the issuer;
translating, by the network translation computing device, the plurality of data elements and the one or more authentication indicators from the web-based format to a network-based format;
generating, by the network translation computing device, a network-format authorization request message including the plurality of data elements in the network-based format; and
transmitting, by the network translation computing device, the network-format authorization request message to the issuer to initiate an authorization process.

16. The method of claim 15, said method further implemented using a directory server, said method further comprising:
routing, by the directory server, the web-based authentication request from a merchant to the access control server;
receiving, by the directory server, the web-based authentication response from the access control server; and
routing, by the directory server, the web-based authentication response to the network translation computing device.

17. The method of claim 15, further comprising:
retrieving, by the network translation computing device, a plurality of rules defining whether a transaction is eligible to have the plurality of data elements and the one or more authentication indicators translated; and
confirming, by the network translation computing device, that the transaction meets the plurality of rules to be eligible for translation.

18. The method of claim 15, further comprising transmitting, by the network translation computing device, the network-format authorization request message to an acquirer associated with the merchant without further input from the merchant.

19. The method of claim 15, further comprising generating, by the network translation computing device, an authorization notification message including at least some of the plurality of data elements of the transaction, and transmitting, by the network translation computing device, the authorization notification message to an acquirer associated with the merchant.

20. The method of claim 15, wherein the web-based format includes XML formatting, and wherein the network-based format includes ISO 8583 network message formatting.

21. The method of claim 15, further comprising identifying, by the directory server, the access control server associated with the issuer of the payment card.

* * * * *